United States Patent [19]

Laude

[11] Patent Number: 5,745,074
[45] Date of Patent: Apr. 28, 1998

[54] STAKING OUT METHOD AND DEVICE USING A SATELLITE POSITIONING SYSTEM

[75] Inventor: Benoit-Marie Laude, Saint Sébastien sur Loire, France

[73] Assignee: Dassault Sercel Navigation-Positionnement, France

[21] Appl. No.: 652,006

[22] Filed: May 23, 1996

[30] Foreign Application Priority Data

May 23, 1995 [FR] France ................... 95 06131

[51] Int. Cl.$^6$ ................... G01S 5/02; B43L 7/10
[52] U.S. Cl. ................... 342/357; 364/561; 33/1 G; 33/464
[58] Field of Search ................... 342/357; 364/561; 33/1 M, 1 G, 1 CC, 464

[56] References Cited

U.S. PATENT DOCUMENTS

| 4,779,212 | 10/1988 | Levy ................... 364/561 |
| 5,144,317 | 9/1992 | Duddek et al. ................... 342/357 |
| 5,512,905 | 4/1996 | Nichols et al. ................... 342/357 |

FOREIGN PATENT DOCUMENTS

| A-0 451 520 | 3/1991 | European Pat. Off. ........... G01S 5/14 |
| A-102 807 | 11/1972 | Netherlands ................... G01C 15/02 |
| WO-A-92 08144 | 2/1991 | WIPO ................... G01R 31/26 |
| WO-A-92 08105 | 11/1991 | WIPO ................... G01C 1/00 |

OTHER PUBLICATIONS

Patent Abstracts of Japan, vol. 9, No. 170, (P-373) (1893) Jul. 16, 1985.

*Primary Examiner*—Gregory C. Issing
*Attorney, Agent, or Firm*—Blakely Sokoloff Taylor & Zafman

[57] ABSTRACT

A method of staking out a point on the ground using a satellite positioning system comprises the following steps: two reference points near a target point are marked on the ground and the positioning system antenna is located on each of the two points to determine their coordinates, the position of the target point relative to the two reference points is determined from these coordinates, the point corresponding to this relative position is marked on the ground, and the staking out is done at this point. The device for implementing the method includes arrangements for marking the two reference points and the target point on the ground.

8 Claims, 1 Drawing Sheet

U.S. Patent        Apr. 28, 1998        5,745,074
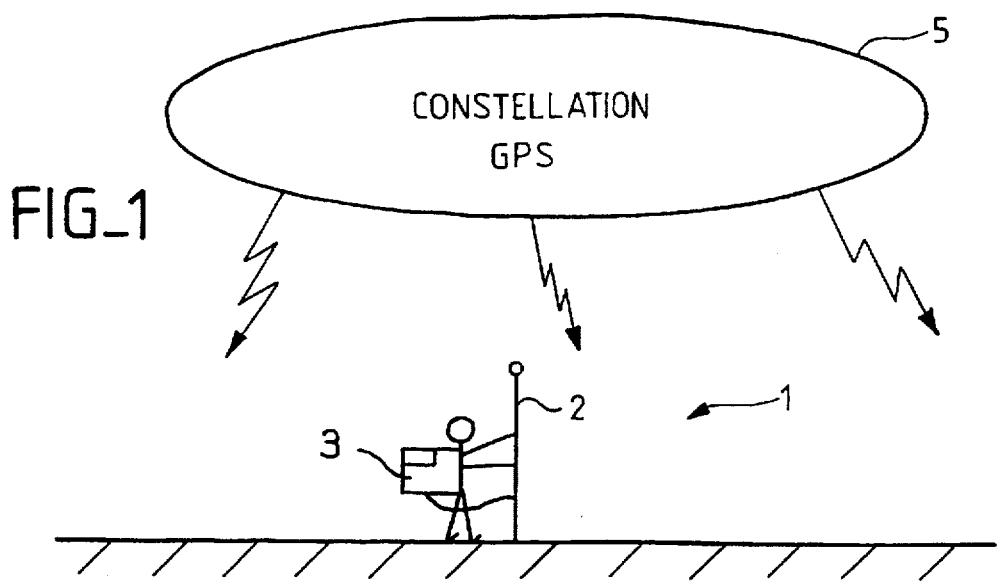
FIG_1
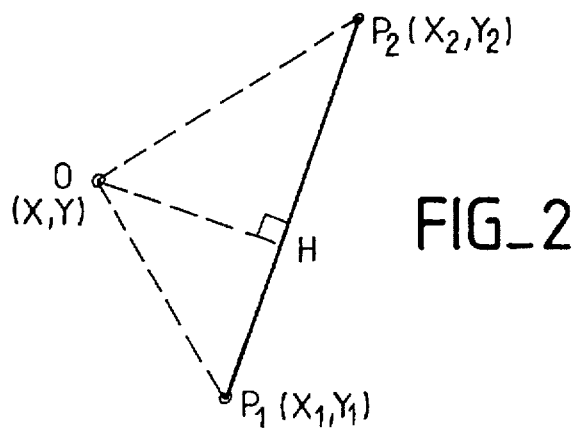
FIG_2
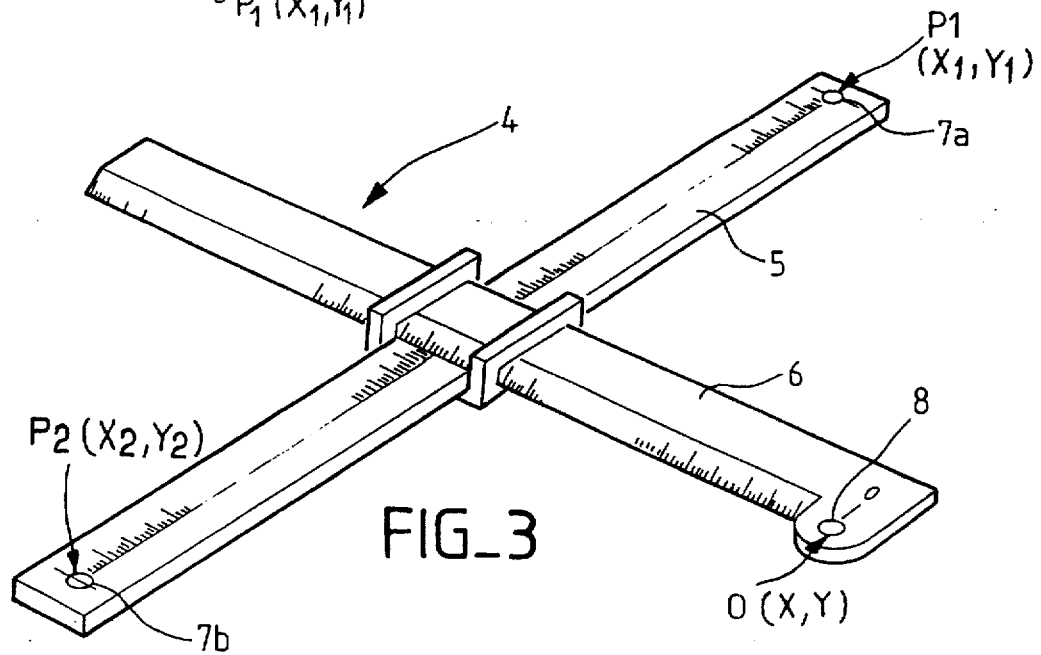
FIG_3

STAKING OUT METHOD AND DEVICE USING A SATELLITE POSITIONING SYSTEM

BACKGROUND OF THE INVENTION

1. Field of the invention

The present invention concerns methods and devices for staking out the ground using positioning satellites.

2. Description of the prior art

In surveying, staking out is usually carried out using optical systems to measure angles and distances (theodolites and tacheometers).

It is becoming increasingly common in surveying to use positioning satellites, in particular the Global Positioning System (GPS) using radio signals transmitted by the satellites of the NAVSTAR constellation.

This has been made possible by the introduction of new techniques for real time kinematic processing of GPS signals.

These techniques are described in many publications and a general description of them can be found in "GPS Vermessung mit Real-Time-Kinematic Technische Untersicht"—VERWENDUNGEN & TECHNISCHE ANGABEN, B 1—7, TRIMBLE —1993.

French patent application n° 94 00523 describes a real time kinematic positioning technique achieving accuracies in the order of one centimeter.

To stake out a point on the ground with predetermined coordinates X, Y the operator conventionally moves the levelling staff (in the case of opto-electronic systems) or the antenna support rod (in the case of satellite positioning systems) in order to converge accurately on the target point.

The operator's movements are guided by position error information supplied by the measuring means.

For accurate staking out the levelling staff or the antenna rod must be perfectly vertical. The staff or rod is therefore usually provided with spirit levels enabling the operator to check at each point that it is vertical again, after being moved.

Thus, in the case of opto-electronic systems, the operator moves the foot of the levelling staff by an amount equal to the difference between the target point and the current measured position, and then adjusts the verticality of the levelling staff before a new measurement is taken.

Achieving convergence is much more difficult using satellite positioning.

This is because the verticality of the rod must be more accurate than in the case of optical measurements, since the measurement point, which is the phase center of the antenna, is approximately two meters above the ground.

It will readily be understood that reducing the offset from the target point and simultaneously holding the antenna vertical makes achieving convergence particularly difficult.

The present invention proposes a method and a device that alleviate this drawback.

SUMMARY OF THE INVENTION

To be more precise, the invention proposes a method of staking out a point on the ground using a satellite positioning system, comprising the following steps:

two reference points near a target point are marked on the ground and the positioning system antenna is located on each of said two points to determine their coordinates, the position of said target point relative to said two reference points is determined from said coordinates, the point corresponding to said relative position is marked on the ground, the staking out is done at said point.

The invention also concerns a device for implementing the method, comprising:

an antenna adapted to receive radio signals transmitted towards the Earth by a constellation of satellites, a processor unit connected to said antenna, means for marking two reference points on the ground, means for determining the position of said target point relative to said two reference points on the basis of coordinates determined for said two reference points by said processor unit, and means for marking on the ground the point corresponding to said relative position.

The means for marking the reference points and the target point on the ground advantageously include two graduated rulers sliding relative to each other in the two directions that they define.

Other features and advantages of the invention will emerge from the following description. This description is given by way of purely illustrative and non-limiting example. It should be read in conjunction with the appended drawings.

BRIEF DESCRIPTION OF THE DRAWINGS

FIG. 1 is a general representation of the satellite positioning system.

FIG. 2 is a geometrical diagram showing the theory of the invention.

FIG. 3 is a perspective view of a device for implementing the invention.

DETAILED DESCRIPTION OF THE PREFERRED EMBODIMENT

Referring to FIG. 1, the operator is provided with means 1 for carrying out position measurements using a satellite positioning system, e.g. the Global Positioning System (GPS).

The means 1 include a rod 2 terminating at a receive antenna and a processor unit 3 carried by the operator and connected to the antenna on the rod 2. The radio signals received by the antenna on the rod 2 from a constellation S of satellites are processed by the unit 3 to supply the operator in real time with the coordinates of the point at which the antenna is located.

The processing carried out by the unit 3 is conventional and familiar to the person skilled in the art. It will not be described here.

To stake out a point, the operator moves to within a few decimeters of a target point O defined by predetermined X and Y coordinates.

Near this point, the operator determines the coordinates X1, Y1 and X2, Y2 of two points PI and P2 marked by him on the ground.

GPS real time kinematic processing techniques, and in particular those described in French patent application n° 94 00523, enable the unit 3 to determine these coordinates with an accuracy in the order of one centimeter.

Knowing the coordinates of the two points PI and P2, the operator determines the position of the target point O relative to these two points.

As shown in FIG. 2, this entails calculating, for example:

the position of point H that is the projection of the target point O on the straight line P1-P2 (determination of the distance P1H or P2H), the distance OH between the straight line P1-P2 and the point O.

This calculation can be carried out by the GPS processor unit 3 or by some other unit connected to the unit 3.

When the relative position has been determined, the operator marks on the ground a point that corresponds to this position relative to the two reference points P1 and P2.

The operator then stakes out this point, if necessary after verifying its coordinates by placing the rod 2 on it.

The points P1 and P2 and the calculated point are advantageously marked on the ground by means of the device 4 shown in FIG. 3, although this is not mandatory (and is not limiting on the invention).

This device comprises two rulers 5 and 6 assembled together so that they can slide relative to each other in both of the two directions that they define.

The ruler 5 carries two centering pins 7a, 7b disposed near its respective ends to mark on the ground the points P1 and P2. The ruler 6 carries at one end a centering pin 8 for marking the target point O.

The device 4 is used in the following manner.

When the operator is near the target point O, the device 4 is laid on the ground with any orientation.

The operator places the end of the antenna support rod 2 on the pin 7a that marks the point P1 and adjusts it until it is vertical.

Using the GPS processor unit 3 connected to the antenna on the rod 2, the operator determines the coordinates X1, Y1 of the point P1.

These operations are repeated with the rod 2 placed on the pin 7b marking the point P2, in order to determine the coordinates X2, Y2 of that point.

The operator then calculates the position of the target point O relative to these points P1 and P2, the coordinates of the point O having been entered into the calculator unit beforehand.

The cursors of the two rulers 5 and 6 are placed on the graduations corresponding to the values of the distances P1H and HO calculated and displayed by the calculator unit.

The target point O to be staked out is marked by the centering pin 8.

The operator determines the coordinates of this point as a verification.

With the method and the device just described staking out is reduced to determining the coordinates of points on the ground, eliminating the convergent iterations required in the prior art techniques to stake out a point accurately.

The method and the device of the invention make staking out very fast and very accurate (precise and non-iterative determination of the point to be staked out).

What is claimed is:

1. Method of staking out a point on the ground using a satellite positioning system, comprising the following steps:

two reference points near a target point, the target point defined by a predetermined x and y coordinates, are marked on the ground using two graduated rulers sliding relative to each other and the positioning system antenna is located on each of said two points to determine their coordinates, the position of said target point relative to said two reference points is determined from said coordinates, the point corresponding to said relative position is marked on the ground, the staking out is done at said point.

2. Method according to claim 1 wherein, after said target point is marked on the ground, said antenna is positioned at said point to verify its coordinates before staking out.

3. Method according to claim 1 wherein said position of said target point relative to said two reference points is determined by calculating the distance between said target point and the straight line defined by said two reference points and the distance between one of said two reference points and the point that corresponds to the orthogonal projection of said target point onto said straight line defined by said two reference points.

4. Method according to claim 1 wherein said satellite positioning system is the Global Positioning System (GPS).

5. Device for staking out a point on the ground using a satellite positioning system, comprising:

an antenna adapted to receive radio signals transmitted towards the Earth by a constellation of satellites, a processor unit connected to said antenna, means for marking two reference points on the ground, means for determining the position of a target point defined by a predetermined x and y coordinates relative to said two reference points on the basis of coordinates determined for said two reference points by said processor unit, and two graduated rulers sliding relative to each other in both of the two directions that the rulers define for marking on the ground the point corresponding to said relative position.

6. Device according to claim 5 wherein one of said two rulers has near each of its ends a pin for centering said antenna on a reference point.

7. Device according to claim 6 wherein the other of said two rulers has at one end a pin for marking said target point.

8. Device according to claim 5 wherein said means for determining said relative position of said target point are calculator means incorporated into said processor unit.

\* \* \* \* \*